United States Patent
Hao et al.

(10) Patent No.: US 11,245,451 B2
(45) Date of Patent: Feb. 8, 2022

(54) METHODS AND APPARATUS FOR CSI-RS PORT SUBSET INDICATION

(71) Applicants: Chenxi Hao, Beijing (CN); Yu Zhang, Beijing (CN); Chao Wei, Beijing (CN); Wanshi Chen, San Diego, CA (US); Hao Xu, Beijing (CN)

(72) Inventors: Chenxi Hao, Beijing (CN); Yu Zhang, Beijing (CN); Chao Wei, Beijing (CN); Wanshi Chen, San Diego, CA (US); Hao Xu, Beijing (CN)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/642,197

(22) PCT Filed: Sep. 8, 2018

(86) PCT No.: PCT/CN2018/104714
§ 371 (c)(1),
(2) Date: Feb. 26, 2020

(87) PCT Pub. No.: WO2019/052407
PCT Pub. Date: Mar. 21, 2019

(65) Prior Publication Data
US 2020/0358503 A1    Nov. 12, 2020

(30) Foreign Application Priority Data

Sep. 12, 2017 (CN) .................. PCT/CN2017/101358

(51) Int. Cl.
*H04B 7/06*         (2006.01)
*H04B 17/336*    (2015.01)
(Continued)

(52) U.S. Cl.
CPC ......... *H04B 7/0626* (2013.01); *H04B 17/336* (2015.01); *H04L 1/1614* (2013.01);
(Continued)

(58) Field of Classification Search
None
See application file for complete search history.

(56) References Cited

U.S. PATENT DOCUMENTS

2015/0131563 A1* 5/2015 Guo .................... H04L 25/0224
                                                                                    370/329
2016/0080052 A1   3/2016 Li et al.
(Continued)

FOREIGN PATENT DOCUMENTS

EP         2863679 A1    4/2015
EP         3276849 A1    1/2018
WO     WO-2016159621 A1    10/2016

OTHER PUBLICATIONS

International Search Report and Written Opinion—PCT/CN2018/104714—ISA/EPO—dated Nov. 26, 2018.
(Continued)

*Primary Examiner* — Otis L Thompson, Jr.
(74) *Attorney, Agent, or Firm* — Qualcomm Incorporated

(57) ABSTRACT

Certain aspects of the present disclosure relate to communication systems, and more particularly, to a partial channel state information reference signal (CSI-RS) port indication. A method by a base station (BS) includes configuring a user equipment (UE) with a CSI-RS resource, of one or more CSI-RS resources associated with a CSI report. The CSI-RS includes a set of CSI-RS ports. The BS provides a first indication to the UE of a subset of groups of the CSI-RS ports to be used by the UE for channel measurements and/or a second indication to the UE of a subset of groups of the CSI-RS to be used by the UE for interference measurements.

(Continued)

Based on the indication, the UE performs channel measurements and/or interference measurements using the indicated subset of CSI-RS ports.

30 Claims, 12 Drawing Sheets

(51) Int. Cl.
  *H04W 76/27* (2018.01)
  *H04L 1/16* (2006.01)
  *H04L 5/00* (2006.01)
  *H04W 24/10* (2009.01)
  *H04W 72/04* (2009.01)
  *H04W 80/08* (2009.01)

(52) U.S. Cl.
  CPC ........... *H04L 5/0051* (2013.01); *H04W 24/10* (2013.01); *H04W 72/042* (2013.01); *H04W 72/0493* (2013.01); *H04W 76/27* (2018.02); *H04W 80/08* (2013.01)

(56) References Cited

U.S. PATENT DOCUMENTS

| | | | |
|---|---|---|---|
| 2017/0331535 A1 | 11/2017 | Wei et al. | |
| 2019/0215119 A1* | 7/2019 | Kim | H04L 1/0027 |
| 2020/0044802 A1* | 2/2020 | Park | H04B 7/0632 |
| 2020/0178240 A1* | 6/2020 | Zhang | H04L 1/0026 |
| 2020/0322022 A1* | 10/2020 | Gao | H04B 17/336 |
| 2021/0075578 A1* | 3/2021 | Wu | H04L 1/06 |

OTHER PUBLICATIONS

International Search Report and Written Opinion—PCT/CN2017/101358—ISA/EPO—dated Jun. 4, 2018.

Qualcomm Incorporated: "Details of CSI Acquisition," 3GPP Draft; R1-1711163, 3GPP TSG RAN WG1 NR Ad-Hoc#2, Qingdao, China; Jun. 17, 2017 (Jun. 17, 2017), pp. 1-5.

Qualcomm Incorporated: "Details of CSI Measurement," 3GPP Draft; R1-1713394, 3GPP TSG RAN WG1 Meeting #90, Prague, Czech; Aug. 12, 2017 (Aug. 12, 2017), pp. 1-6.

AT&T: "Details on the Design of Two Stage Downlink Control Channel for NR", 3GPP Draft, R1-1700319, 3GPP TSG RAN WG1 Meeting NR AdHoc, Two Stage DL Control Channel Design, 3rd Generation Partnership Project (3GPP), Mobile Competence Centre, 650, Route Des Lucioles, F-06921 Sophia-Antipolis Cedex, France, vol. RAN WG1, No. Spokane, USA, Jan. 16, 2017-Jan. 20, 2017, Jan. 10, 2017 (Jan. 10, 2017), XP051202798, 7 Pages, Retrieved from the Internet: URL:http://www.3gpp.org/ftp/tsg_ran/WG1_RL1/TSGR1_AH/NR_AH_1701/Docs/[retrieved on Jan. 10, 2017] p. 4.

Supplementary European Search Report—EP18857044—Search Authority—Munich—dated May 7, 2021.

* cited by examiner

METHODS AND APPARATUS FOR CSI-RS PORT SUBSET INDICATION

CROSS-REFERENCE TO RELATED APPLICATION & PRIORITY CLAIM

This application is a national stage application under 35 U.S.C. 371 of PCT/CN2018/104714, filed Sep. 8, 2018, which claims benefit of and priority to International Application No. PCT/CN2017/101358, filed Sep. 12, 2017, both herein incorporated by reference in their entireties as if fully set forth below and for all applicable purposes.

INTRODUCTION

Field of the Disclosure

Aspects of the present disclosure relate to wireless communications, and more particularly, to techniques for a channel state information (CSI) reference signal (RS) port subset indication.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a base station (BS). The method generally includes configuring a user equipment (UE) with a channel state information reference signal (CSI-RS) resource of one or more CSI-RS resources associated with a CSI report. The CSI-RS resource includes a set of CSI-RS ports. The BS partitions the set of CSI-RS ports into groups of CSI-RS ports. The BS provides a first indication to the UE of a subset of the groups of the CSI-RS ports to be used by the UE for channel measurements and/or a second indication to the UE of a subset of the groups of the CSI-RS ports to be used by the UE for interference measurements.

Certain aspects provide an apparatus for wireless communication, such as a BS. The apparatus generally includes means for configuring a UE with a CSI-RS resource of one or more CSI-RS resources associated with a CSI report. The CSI-RS resource includes a set of CSI-RS ports. The apparatus includes means for partitioning the set of CSI-RS ports into groups of CSI-RS ports. The apparatus includes means for providing a first indication to the UE of a subset of the groups of the CSI-RS ports to be used by the UE for channel measurements and/or a second indication to the UE of a subset of the CSI-RS ports to be used by the UE for interference measurements.

Certain aspects provide an apparatus for wireless communication, such as a BS. The apparatus generally includes at least one processor coupled with a memory and configured to configure a UE with a CSI-RS resource of one or more CSI-RS resources associated with a CSI report. The CSI-RS resource includes a set of CSI-RS ports. The at least one processor is further configured to partition the set of CSI-RS ports into groups of CSI-RS ports. The apparatus includes a transmitter configured to provide a first indication to the UE of a subset of the groups of the CSI-RS ports to be used by the UE for channel measurements and/or a second indication to the UE of a subset of the groups of the CSI-RS ports to be used by the UE for interference measurements.

Certain aspects provide a computer readable medium. The computer readable medium has computer executable code stored for wireless communication. The computer executable code generally includes code for configuring a UE with a CSI-RS resource of one or more CSI-RS resources associated with a CSI report. The CSI-RS resource includes a set of CSI-RS ports. The computer executable code generally includes code for partitioning the set of CSI-RS ports into groups of CSI-RS ports and code for providing a first indication to the UE of a subset of the groups of the CSI-RS ports to be used by the UE for channel measurements and/or a second indication to the UE of a subset of the groups of the CSI-RS ports to be used by the UE for interference measurements.

Certain aspects provide a method for wireless communication by a UE. The method generally includes receiving a CSI-RS resource configuration from a BS of one or more CSI-RS resources associated with a CSI report. The CSI-RS resource includes a set of CSI-RS ports. The UE receives a first indication of a subset of groups of the CSI-RS ports to be used by the UE for channel measurements and/or a second indication of a subset of groups of the CSI-RS to be used by the UE for interference measurements. The method includes performing the channel measurements or interference measurement using the indicated subset of groups of CSI-RS ports.

Certain aspects provide an apparatus for wireless communication, such as a UE. The apparatus generally includes means for receiving a CSI-RS resource configuration from a BS of one or more CSI-RS resources associated with a CSI report. The CSI-RS resource includes a set of CSI-RS ports. The apparatus includes means for receiving a first indication of a subset of groups of the CSI-RS ports to be used by the apparatus for channel measurements and/or a second indication of a subset of groups of the CSI-RS to be used by the apparatus for interference measurements and means for performing the channel measurements or interference measurements using the indicated subset of groups of CSI-RS ports.

Certain aspects provide an apparatus for wireless communication, such as a UE. The apparatus generally includes a receiver configured to receive a CSI-RS resource configuration from a BS of one or more CSI-RS resources associated with a CSI report. The CSI-RS resource includes a set of CSI-RS ports. The receiver is configured to receive a first indication of a subset of groups of the CSI-RS ports to be used by the apparatus for channel measurements and/or a second indication of a subset of groups of the CSI-RS to be used by the apparatus for interference measurements. The apparatus includes at least one processor coupled with a memory and configured to perform the channel measurements or interference measurements using the indicated subset of groups of CSI-RS ports.

Certain aspects provide a computer readable medium. The computer readable medium includes computer executable code stored thereon for wireless communication. The computer executable code generally includes code for receiving a CSI-RS resource configuration from a BS of one or more CSI-RS resources associated with a CSI report. The CSI-RS resource includes a set of CSI-RS ports. The computer executable code also includes code for receiving a first indication of a subset of groups of the CSI-RS ports to be used by a UE for channel measurements and/or a second indication of a subset of groups of the CSI-RS to be used by the UE for interference measurements and code for performing the channel measurements or interference measurements using the indicated subset of groups of CSI-RS ports.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
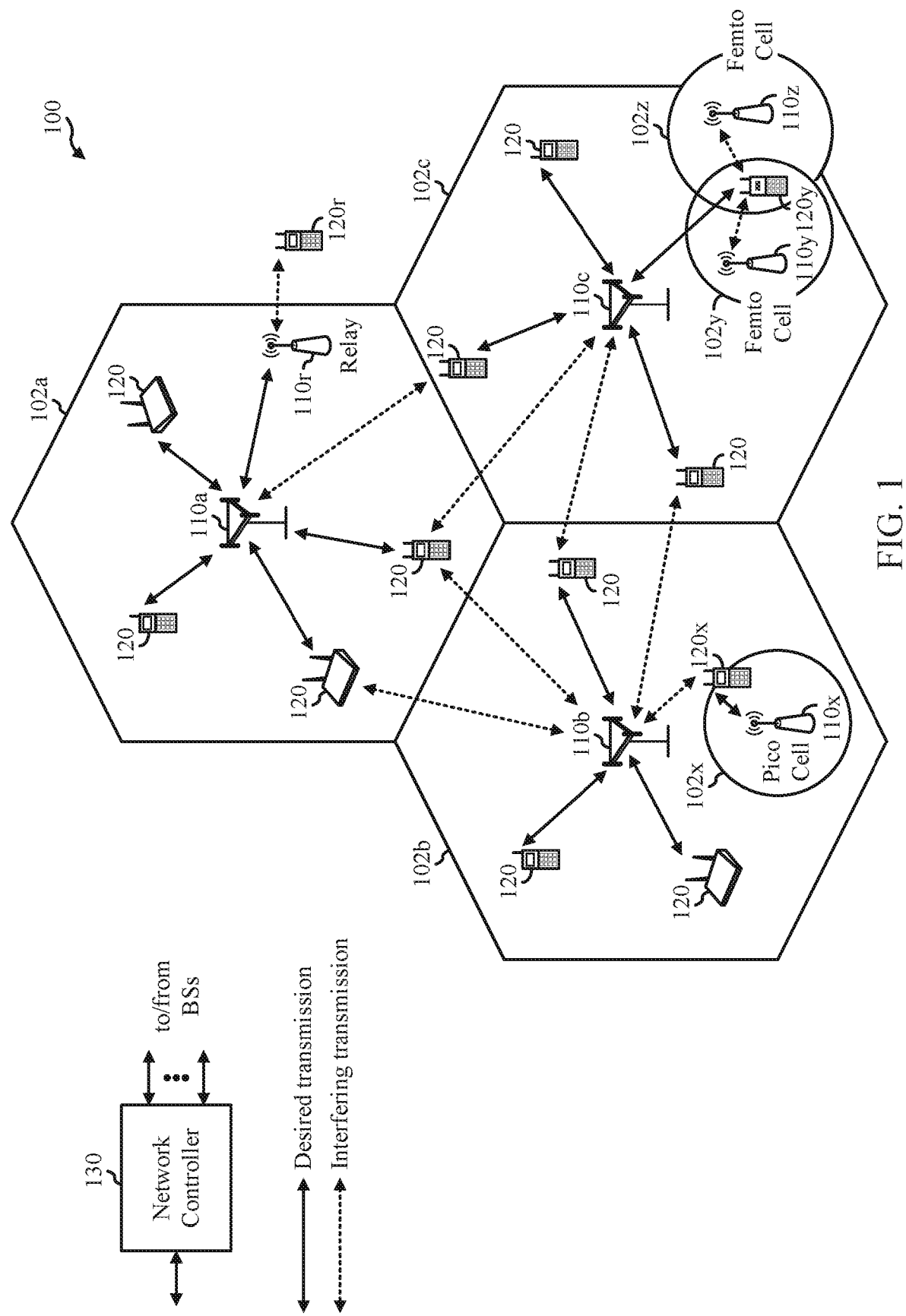
FIG. 1 is a block diagram conceptually illustrating an example telecommunications system, in accordance with certain aspects of the present disclosure.

Some aspects of the present disclosure provide apparatus, methods, processing systems, and computer readable mediums for new radio (NR) (new radio access technology or 5G technology). NR may support various wireless communication services, such as Enhanced mobile broadband (eMBB) targeting wide bandwidth (e.g., 80 MHz beyond), millimeter wave (mmW) targeting high carrier frequency (e.g., 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (T) to meet respective quality of service (QoS) requirements. In addition, these services may co-exist in the same subframe.

The present disclosure provides methods and apparatus for a partial channel state information reference signal (CSI-RS) port indication. In NR, the CSI report includes channel measurement and interference measurement. The interference measurements can be used for multi-user MIMO (MU-MIMO) and/or service by multiple transmission points (TPs). The base station (BS) can configure the user equipment (UE) with a CSI report setting, for example, setting a CSI report trigger such as indicating non-zero power resources for channel measurement and/or interference and zero power resources for interference measurement. The BS also configures the CSI-RS resources including CSI-RS ports mapped to time and frequency resources (e.g., resource elements (REs)/resource blocks (RBs)). In some cases, not all resources configured for by the CSI report setting and CSI-RS resource setting are/can be/should be used by the UE for channel measurement. Thus, techniques for the BS to indicate subsets of CSI-RS ports in a CSI-RS resource for channel measurements and/or interference measurement are desirable. Accordingly, techniques are provided herein for a CSI-RS subset indication.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless communication network 100, such as a new radio (NR) or 5G network, in which aspects of the present disclosure may be performed, for example, for a partial channel state information reference signal (CSI-RS) ports indication as described in more detail below. A user equipment (UE) 120 may be configured by a base station (BS) 110 with a CSI report setting and a CSI-RS resource setting indicating CSI-RS ports mapped to time and frequency resources. The BS 110 provides the UE 120 with an indication of a subset of the CSI-RS to be used for channel measurement or interference measurement.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
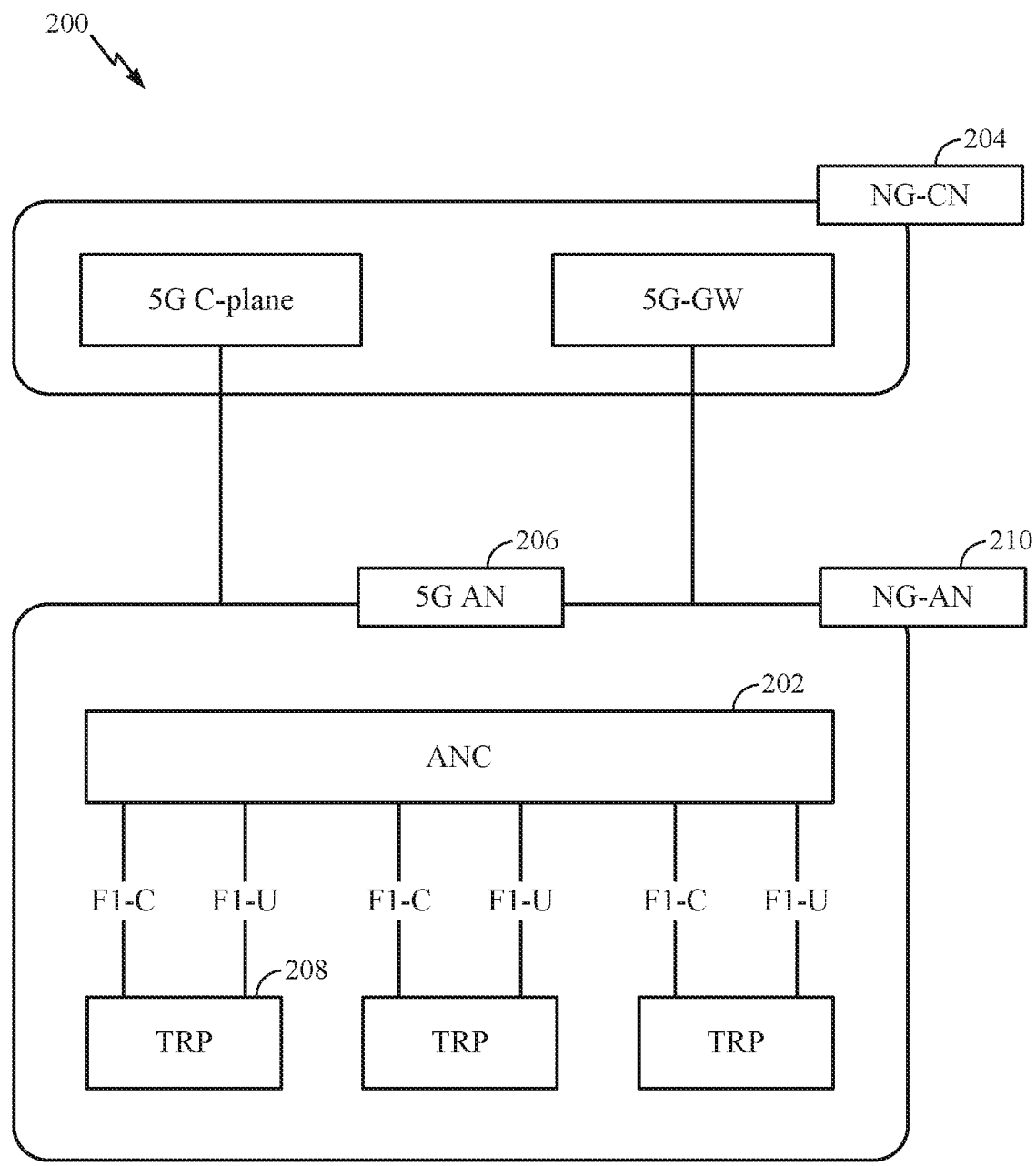
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
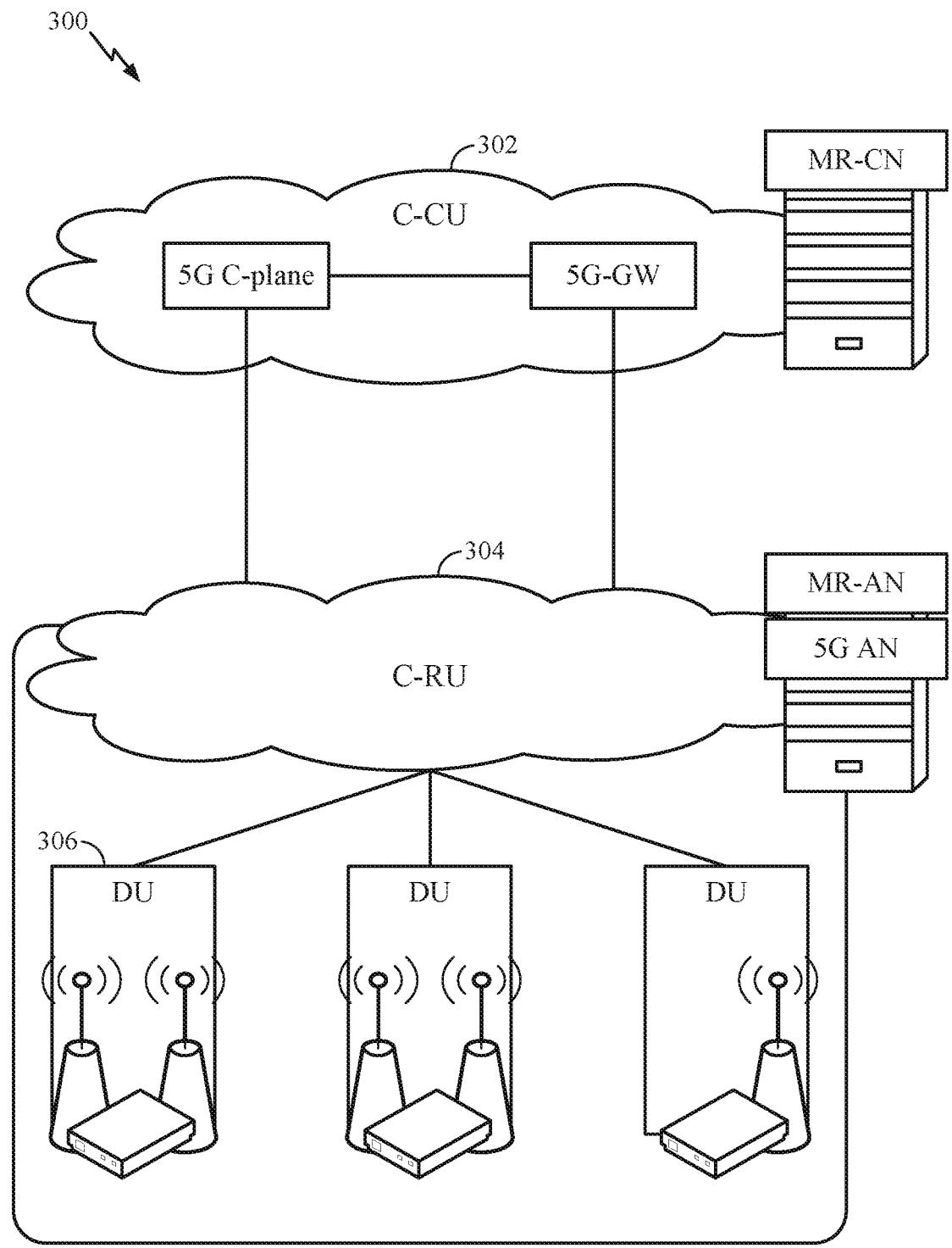
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
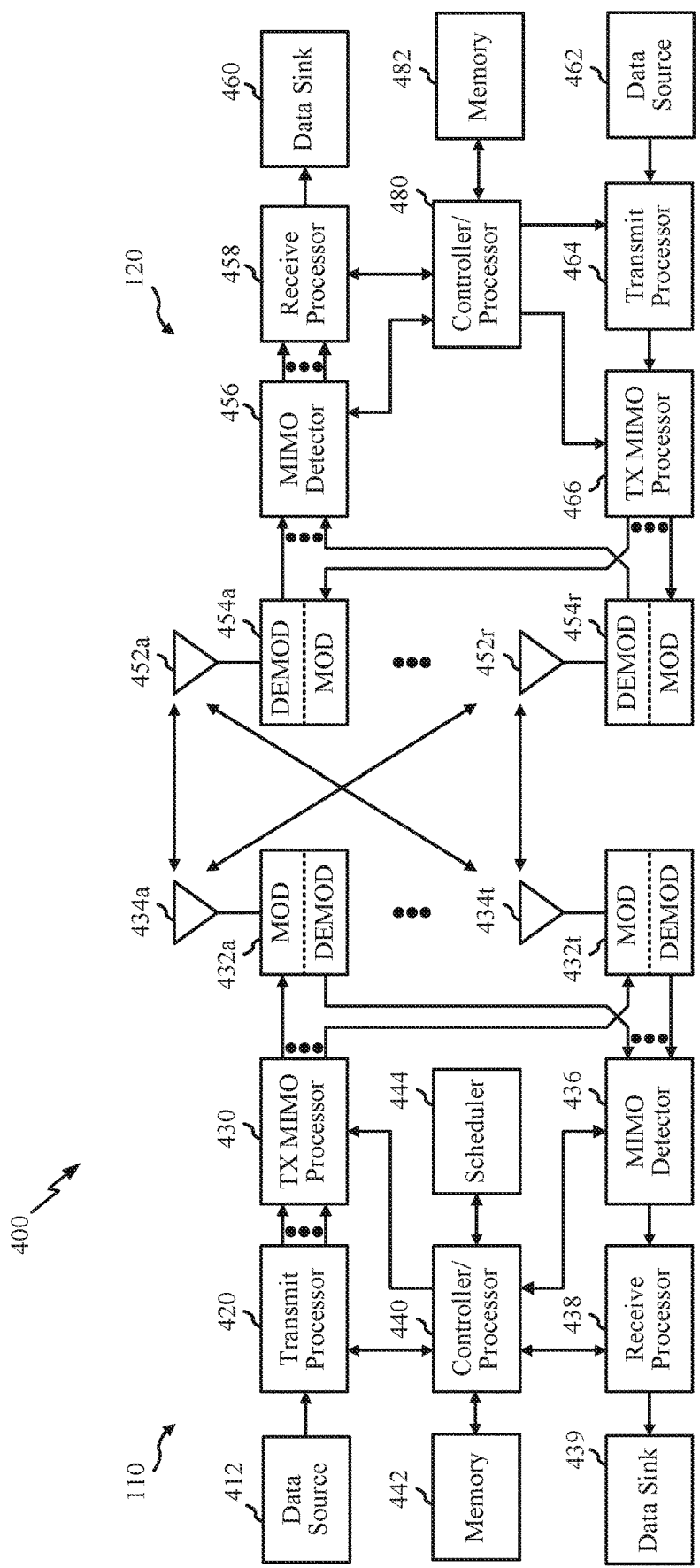
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein and illustrated with reference to FIG. 11 and FIG. 14.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHCH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g. for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
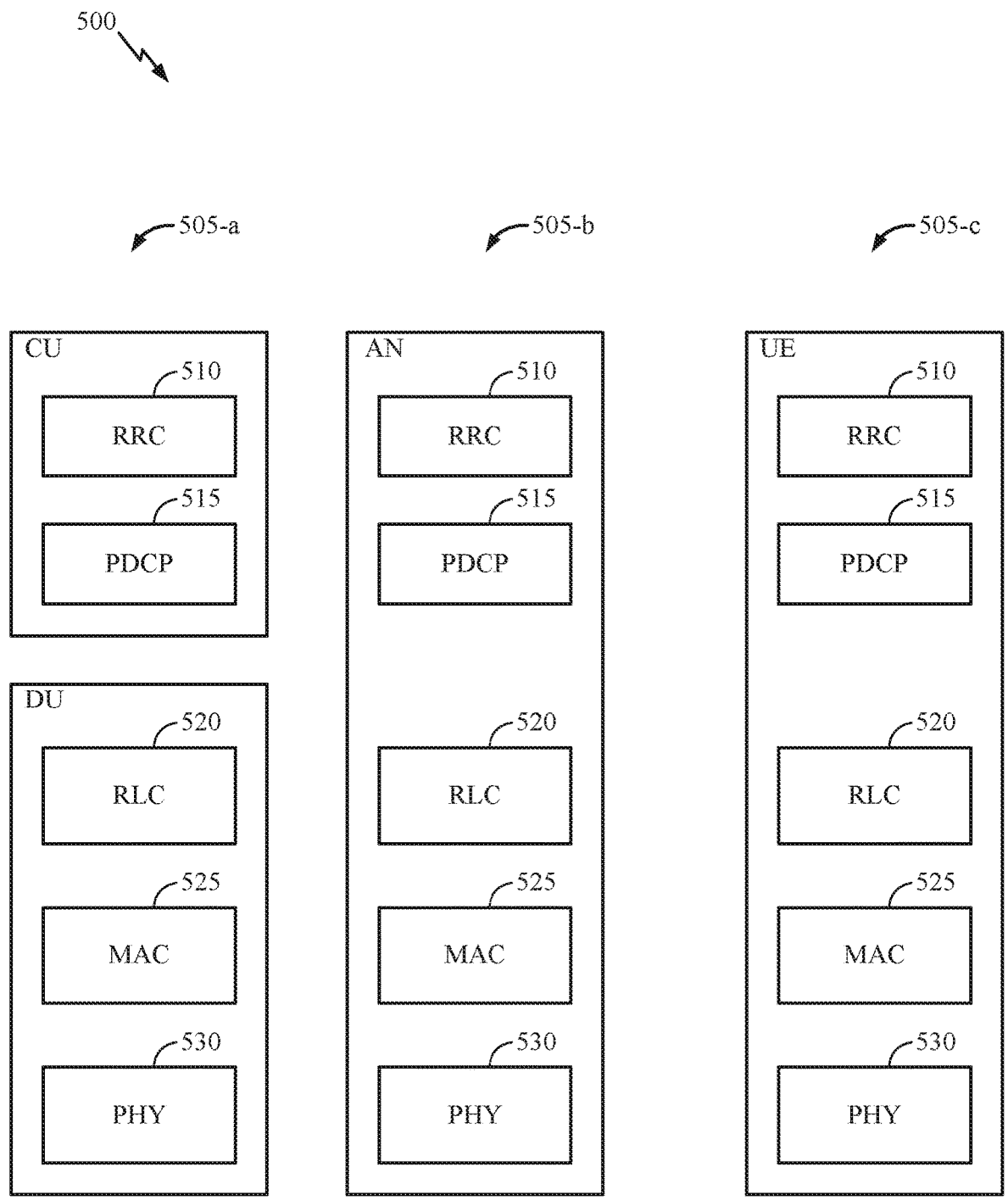
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-*b* may be useful in, for example, a femto cell deployment.

Regardless of whether a network access device implements part or all of a protocol stack, a UE may implement an entire protocol stack as shown in 505-*c* (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
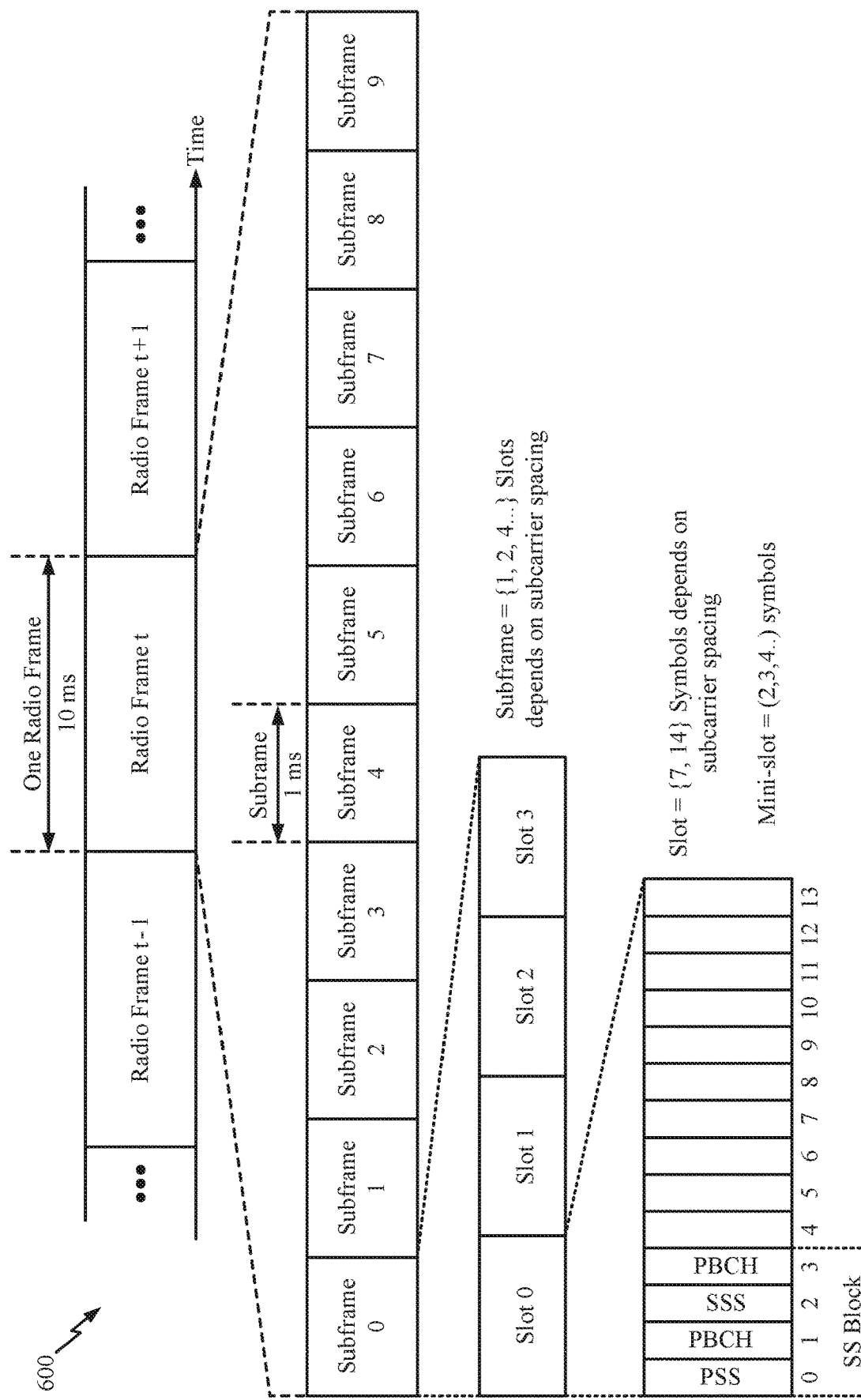
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Methods and Apparatus for CSI-RS Port Subset Indication

In certain systems (e.g., long term evolution (LTE) systems), to indicate the quality of a channel (e.g., a link between the user equipment (UE) and the base station (BS)), the UE performs measurements and sends a channel state (status) information (CSI) report to the BS. For example, the UE can measure CSI reference signals (CSI-RS) transmitted by the BS. The CSI report generally includes a channel quality indicator (CQI), a precoding matrix indicator (PMI), and a rank indicator (RI).

In certain systems, such a new radio (NR) or 5G systems, the UE may perform both channel measurements (CM) (e.g., and channel estimation) and interference measurements (IM) for the CSI report. The interference measurements may be useful to support multi-user multiple-input multiple-output (MU-MIMO) transmission and/or transmission by multiple transmission points (e.g., BSs, gNBs, or transmission reception points (TRPs)).

In NR, the UE is configured with a CSI report setting. The network may transmit a CSI report trigger indicating for the UE to send a CSI report according to the CSI report setting. The UE is also configured with a CS-RS resource setting. The CSI-RS resource setting provides the UE with the configuration of CSI-RS ports mapped to time and frequency resources (e.g., resource elements (REs)). CSI-RS resources can be zero power (ZP) or non-zero power (NZP). The UE can be configured for channel measurements and/or interference measurements using the CSI-RS resources. The CSI-RS report setting and the CSI-RS resource setting are configured via higher layer signaling. A CSI-RS trigger and CSI report trigger may be configured via downlink control information (DCI). The CSI-RS trigger is a signaling indicating to the UE that CS-RS will be transmitted. The transmission of the CSI-RS follows the setting indicated by the CSI-RS resource setting.

Figure 7:
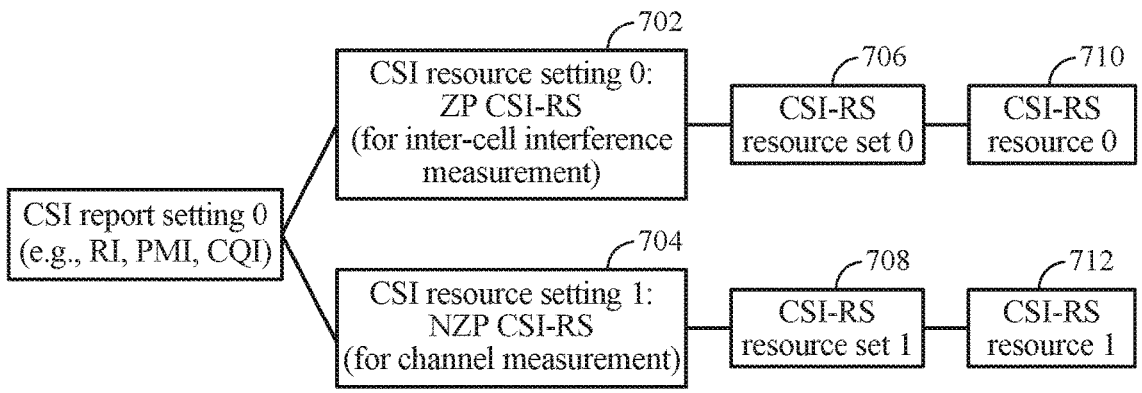
FIGS. 7-9 are example channel state information (CSI) report and CSI reference signal (CSI-RS) resource settings, in accordance with certain aspects of the present disclosure.
Figure 8:
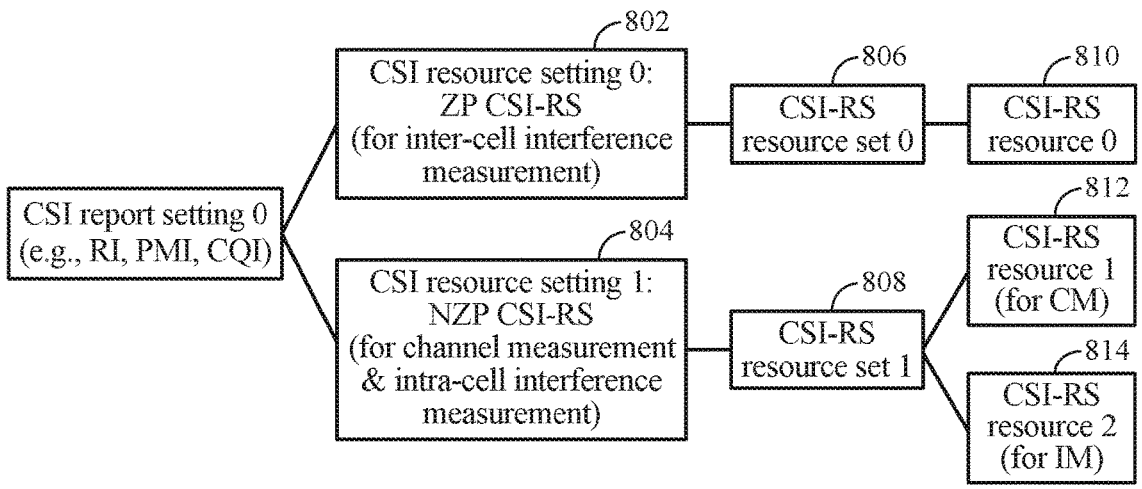
Figure 9:
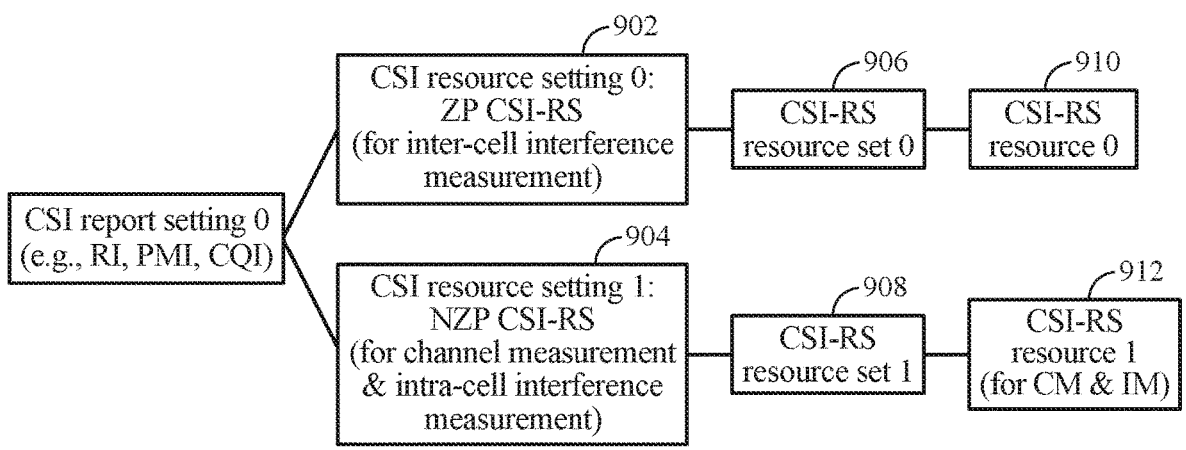

FIGS. 7-9 are example CSI report and CSI-RS resource settings, in accordance with certain aspects of the present disclosure. As shown in FIGS. 7-9, the CSI report setting 0 configures the UE for transmitting the CSI-RS report, for example, including the RI, PMI, and CQI. As shown in FIGS. 7-9, a CSI-RS resource setting 0 can correspond to a ZP CSI-RS (702, 802, 902) and an associated CSI-RS resource set 0 (706, 806, 906). A CSI-RS resource setting 1 can correspond to a NZP CSI-RS (704, 804, 904) and an associated CSI-RS resource set 1 (708, 808, 908). The ZP CSI-RS (702, 802, 902) may be used for inter-cell interference measurement. The NZP CSI-RS (704, 804, 904) may be used for channel measurement (as shown in FIG. 7) or for channel measurement and intra-cell interference measurement (as shown in FIGS. 8 and 9). The CSI-RS resource set 0 (706, 806, 906) may be associated with the CSI resource 0 (710, 810, 910) for the inter-cell interference measurement. The CSI-RS resource set 1 may be associated with the CSI resource 1 (712, 812, 912) for the NZP CSI-RS. The CSI resource 1 may be used for the channel measurement (as shown in FIGS. 7 and 8) or for the channel measurement and the intra-cell interference measurement (as shown in FIG. 9). As shown in FIG. 8, the CSI-RS resource set may be associated with different resources for the channel measurement (CSI resource 1 812) and the intra-cell interference measurements (CSI resource 2 814).

Figure 10:
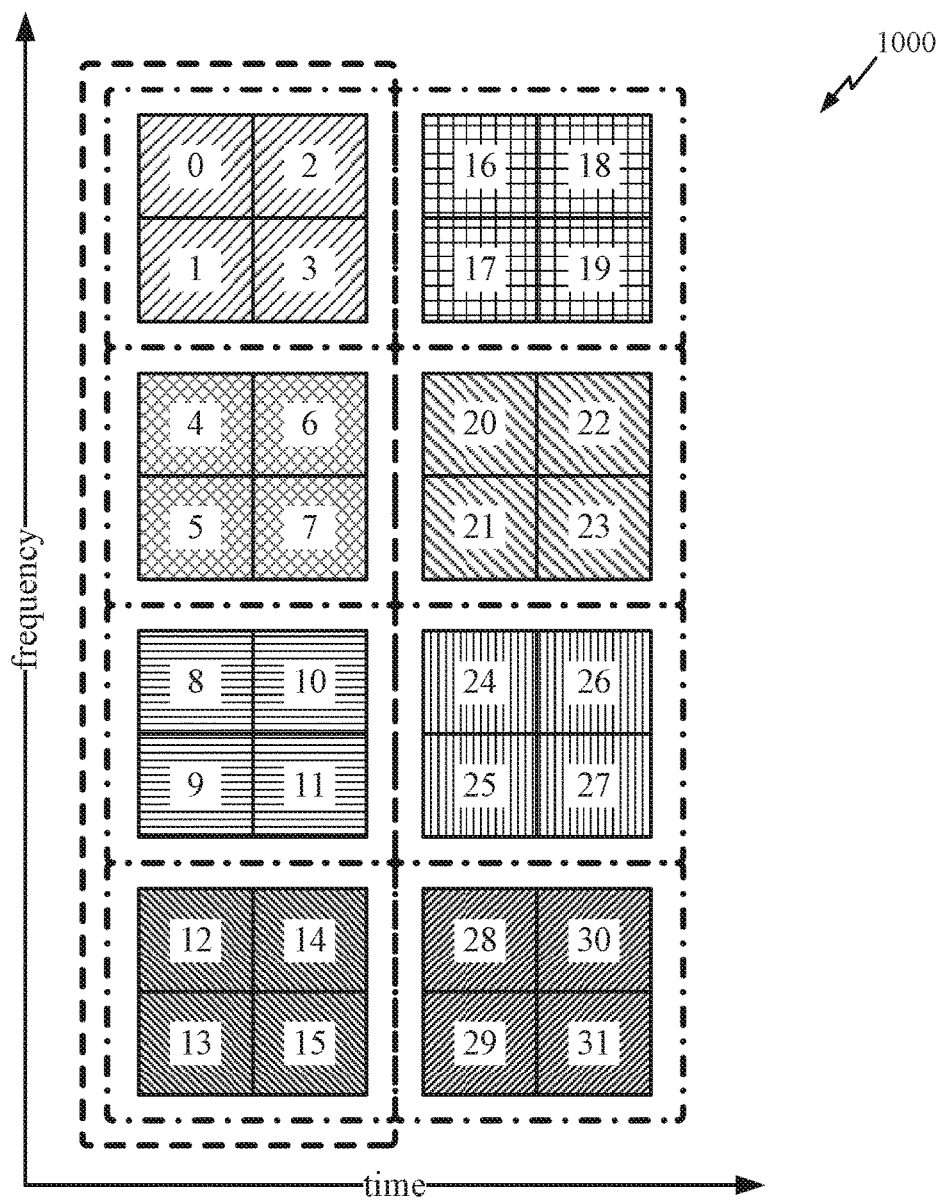
FIG. 10 illustrates an example CSI-RS resource, in accordance with certain aspects of the present disclosure.
Figure 10:

FIG. 10 illustrates an example CSI-RS resource 1000, in accordance with certain aspects of the present disclosure. In the example shown in FIG. 10, the CSI-RS resource includes 32 CSI-RS ports (0-31). In this example, a 2×2 component resource is defined with two contiguous symbols and two contiguous REs. In this example, the CSI-RS ports are code division multiplexed (CDM) in groups of four (CDM4) and span one component resource.

In NR, the UE can be configured with a CSI-RS resource of X CSI-RS ports, but only Y (Y<X) of the configured CSI-RS ports are used for the channel measurement and/or interference measurements. For example, for resources configured only for channel measurement, the CSI-RS resource setting for NZP CSI-RS for channel measurement (e.g., such as NZP CSI-RS resource setting 704) may configure X ports for channel measurements; however, due to UE capability, the UE may only support CSI computation and reporting for Y ports, or Y ports may be configured for the UE to perform channel measurements and the remaining X-Y ports are configured for a different UE or UEs to perform channel measurements. In another example, for resources configured only for interference measurements by the UE (e.g., such as NZP CSI-RS resource setting 904), X ports may be configured, but the UE may be configured with Y ports for the UE to perform interference measurements and the remaining X-Y ports are configured for a different UE or UEs to perform measurements. In yet another examples, for channel measurements and interference measurements by the UE, the CSI-RS resource setting (e.g., such as NZP CSI-RS resource setting 804 or 904) can configure X ports, but Y ports are configured for the UE to perform channel measurements and the remaining X-Y ports are configured for the UE to perform interference measurements.

Thus, techniques are desirable for indicating to the UE which ports are used for channel measurements and which ports are used for interference measurement.

Aspects of the present disclosure provide methods for a partial CSI-RS port indication.

Figure 11:
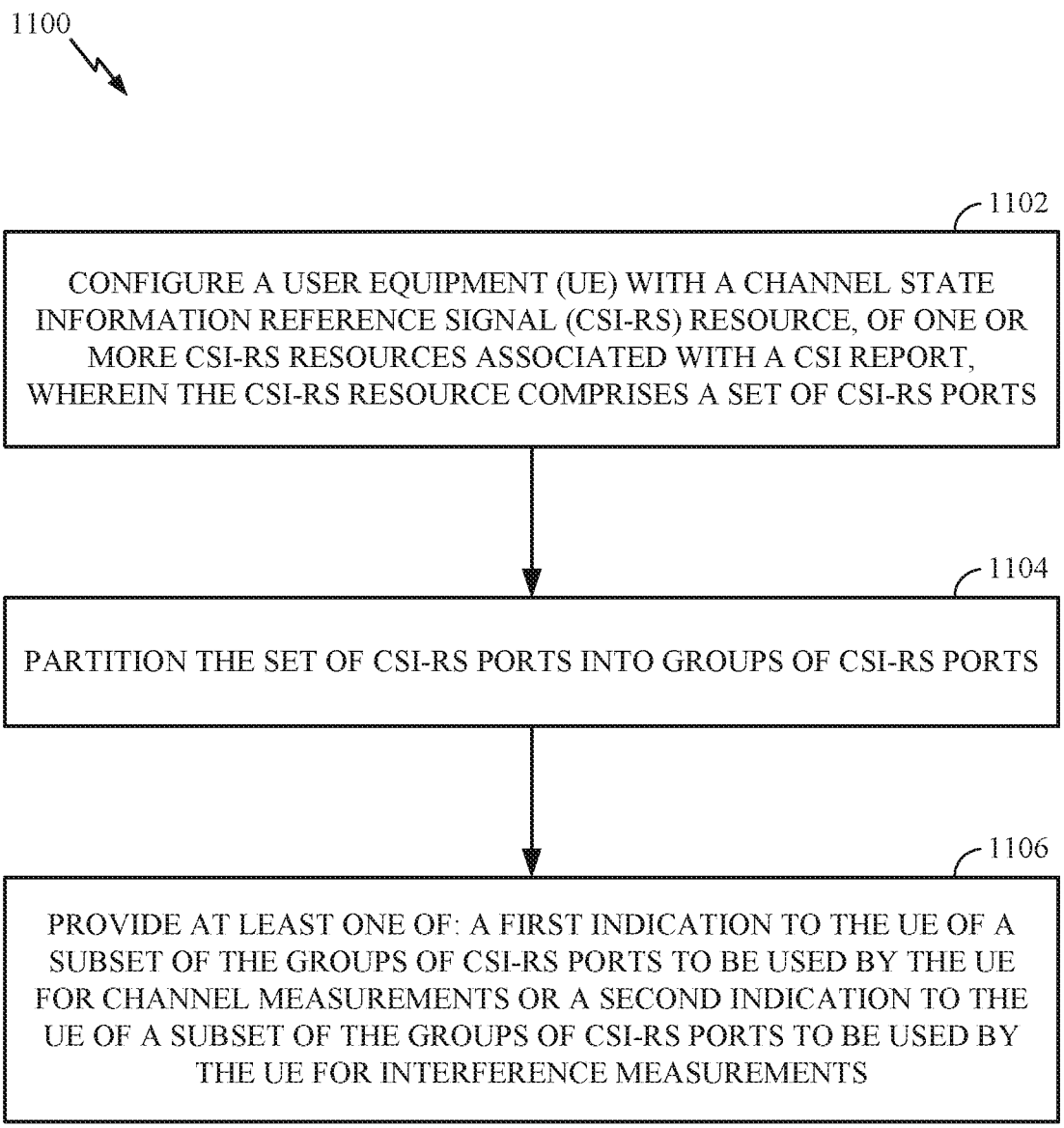
FIG. 11 illustrates example operations for wireless communications performed by a BS for partial CSI-RS port indication, in accordance with certain aspects of the present disclosure.

FIG. 11 illustrates example operations 1100 for wireless communications, in accordance with aspects of the present disclosure. Operations 110 may be performed by a BS, for example, such as a BS 110 in the wireless communication network 100 shown in FIG. 1.

Operations 1100 begin, at block 1102, by configuring a UE with a CSI-RS resource of one or more CSI-RS resources associated with a CSI report. The CSI-RS resource includes a set of CSI-RS ports. The CSI-RS may be mapped to REs. The BS may also configure the UE with a CSI report setting corresponding to the configured set of CSI-RS ports.

At 1104, the BS partitions the set of CS-RS ports into groups of CSI-RS ports.

At 1106, the BS provides at least one of: a first indication to the UE of a subset of the CSI-RS ports (e.g., NZP CSI-RS ports) to be used by the UE for channel measurements (e.g., and channel estimation) or a second indication to the UE of a subset of the CSI-RS ports to be used by the UE for interference measurements. The indication may inform the UE of the number of ports used for channel measurements and/or which of the ports are used for channel measurement. Another bit or bits in the provided indication, or in a separate indication, may indicate to the UE whether and/or which of the remaining CSI-RS ports are used by the UE for interference measurements.

The indicated subset of CSI-RS ports may be based on a capability of the UE for performing CSI feedback reporting, based on other UEs the BS schedules some of the CSI-RS ports to perform channel measurements, and/or based on CSI-RS ports the BS schedules the UE to perform interference measurements. For example, the BS may indicate some CSI-RS ports for the UE to perform channel measurements, the BS may indicate other CSI-RS ports for the UE to perform interference measurements, the BS may indicate some CSI-RS ports for the UE to perform both channel measurements and interference measurements, and/or the BS may indicate some CSI-RS ports for different UEs to perform channel and/or interference measurements.

According to certain aspects, the port subset indication(s) can be provided semi-persistently via radio resource control (RRC) signaling. The indication(s) may be provided with the configuring of the CSI-RS resource setting or the CSI report setting. Alternatively, the indication may be provided separately.

According to certain aspects, the indication(s) may be provided dynamically via downlink control information (DCI). For example, the indication(s) can be provided using a 1-stage DCI with the configuring of a CSI-RS trigger, with the configuring of the CSI report trigger, or separately. Alternatively, the indication(s) can be provided using a 2-stage DCI. For example, the CSI report trigger may be configured via a first stage of the 2-stage DCI and the indication is provided with a second stage of the 2-stage DCI. If the UE fails to decode the first stage DCI, then the UE may ignore the second stage of the 2-stage DCI. If the UE fails to decode the first stage DCI, the UE may refrain from performing CSI calculation and CSI reporting, even if the second stage DCI is decoded successfully.

According to certain aspects, the indication(s) may be provided using a bitmap. For example, the BS may send a bitmap to the UE indicating, for each of the set of CSI-RS ports, whether that CSI-RS port is to be used for channel measurement or interference measurement (e.g., using X bits to indicate for each of the X available CSI-RS ports).

According to certain aspects, the BS can first partition (e.g., group) the set of CSI-RS ports into groups of CSI-RS ports (e.g., X CSI-RS ports partitioned into Z groups, each containing X/Z ports). The BS sends a bitmap to the UE indicating, for each group of CSI-RS ports, whether that group of CS-RS ports is to be used for channel measurement or interference measurement (e.g., using Z bits to indicate for each of the Z groups). In the example of 32 ports, in one implementation, the ports may be divided into 8 groups of 4 ports each (e.g., {0,1,2,3}, {4,5,6,7}, {8,9,10,11}, {12,13,14,15}, {16,17,18,19}, {20,21,22,23}, {24,25,26,27}, {28,29,30,31}). In this case, the number of bits indicating channel measurements may be at most Y/(X/Z).

The partitioning/grouping may be based on a size (number of ports) of the set of CSI-RS ports, a size of the subset of CSI-RS ports, the mapping of the set of CSI-RS ports to the REs, the antenna architecture at the BS (e.g., the dimension of the 2D antenna array and/or the number of panels), a codebook configuration used for CSI reporting, and/or an association between CS-RS ports and the precoders of the codebook (e.g., a mapping of the CSI-RS ports to antenna ports). The groups of CSI-RS ports may include groups of CDM CSI-RS ports or of component CSI-RS resources. For example, CSI-RS ports may be grouped with other CSI-RS belonging to the same CDM group or component CSI-RS pattern. The partitioning and/or the size of the groups may be configured by the network via higher layer signaling or may be fixed in the wireless standards (e.g., and preconfigured in the BS and UE).

Figure 12:
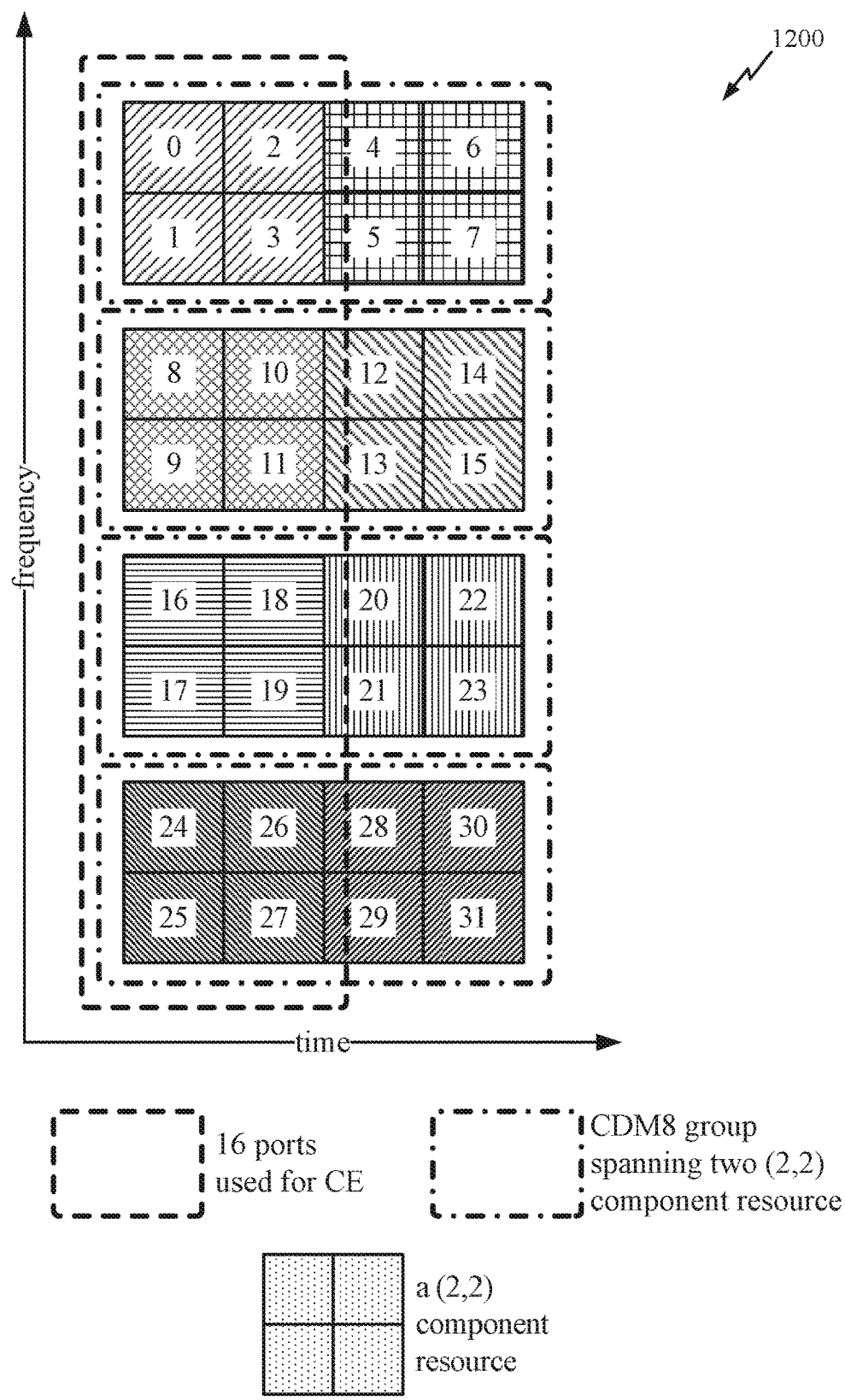
FIGS. 12-13 illustrate example CSI-RS resources, in accordance with certain aspects of the present disclosure.
Figure 13:
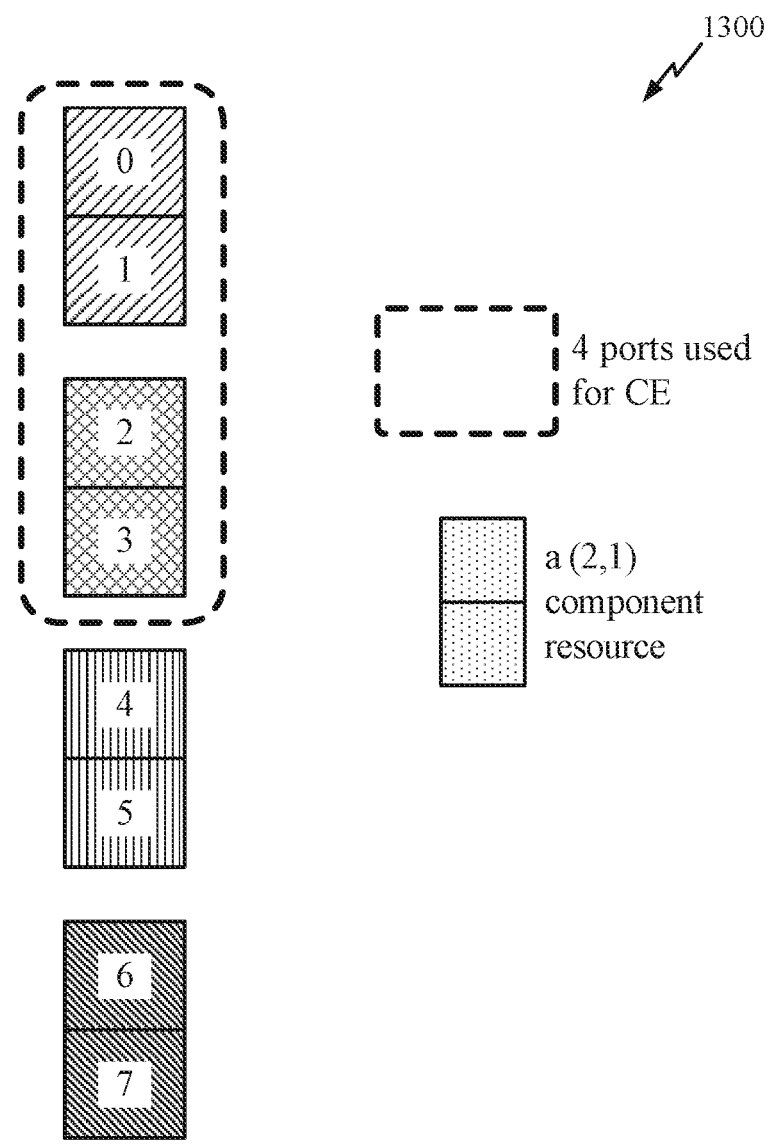

According to certain aspects, the BS can send a 2-stage (e.g., hierarchal) bitmap (e.g., first and second bitmaps). The first stage of the bitmap may indicate, for each CDM group or CSI-RS component, whether that CDM group or CSI-RS component is used for channel measurement or interference measurement, for example, whether any (one or more of the) of the CSI-RS ports in that group are used for channel measurement or interference measurement. For example, for CDM4 as shown in FIG. 10, the first stage bitmap may be 8 bits (e.g., 11110000 indicating the first four CDM group/CSI-RS component resource is used for channel measurement). In another example, for CDM8 (e.g., as shown in FIG. 12) the first stage bitmap may be 4 bits (e.g., 1111 indicating that all 4 CDM groups are used for channel measurement). According to certain aspects, the ports may be frequency division multiplexed (FDM) instead of CDM as shown in FIG. 13.

The second stage of the 2-stage bitmap indicates, for each CSI-RS port in each group indicated in the first stage of the bitmap, whether that CSI-RS port is to be used for channel measurement or interference measurement. The second stage bitmap maps the local port index with respect to each CDM group/CSI-RS component resource. The BS may send the first bitmap for the groups of CS-RS ports to multiple UEs, while the second bitmap may be UE-specific. For the CDM4 example shown in FIG. 10, the second stage bitmap may be 4 bits for each group/CSI-RS component resource (e.g., 1111 indicating each of the four ports in a group are used for channel measurement). For the CDM8 example shown in FIG. 12, the second stage bitmap may be 8 bits for each group/CSI-RS component resource (e.g., 11110000 indicating the four ports are used for channel measurement).

According to certain aspects, after using the bitmap to indicate the subset of CSI-RS ports to use for channel measurement, the BS may use a 1-bit indication to indicate to the UE whether the remaining CSI-RS ports should be used by the UE for interference measurement.

Figure 14:
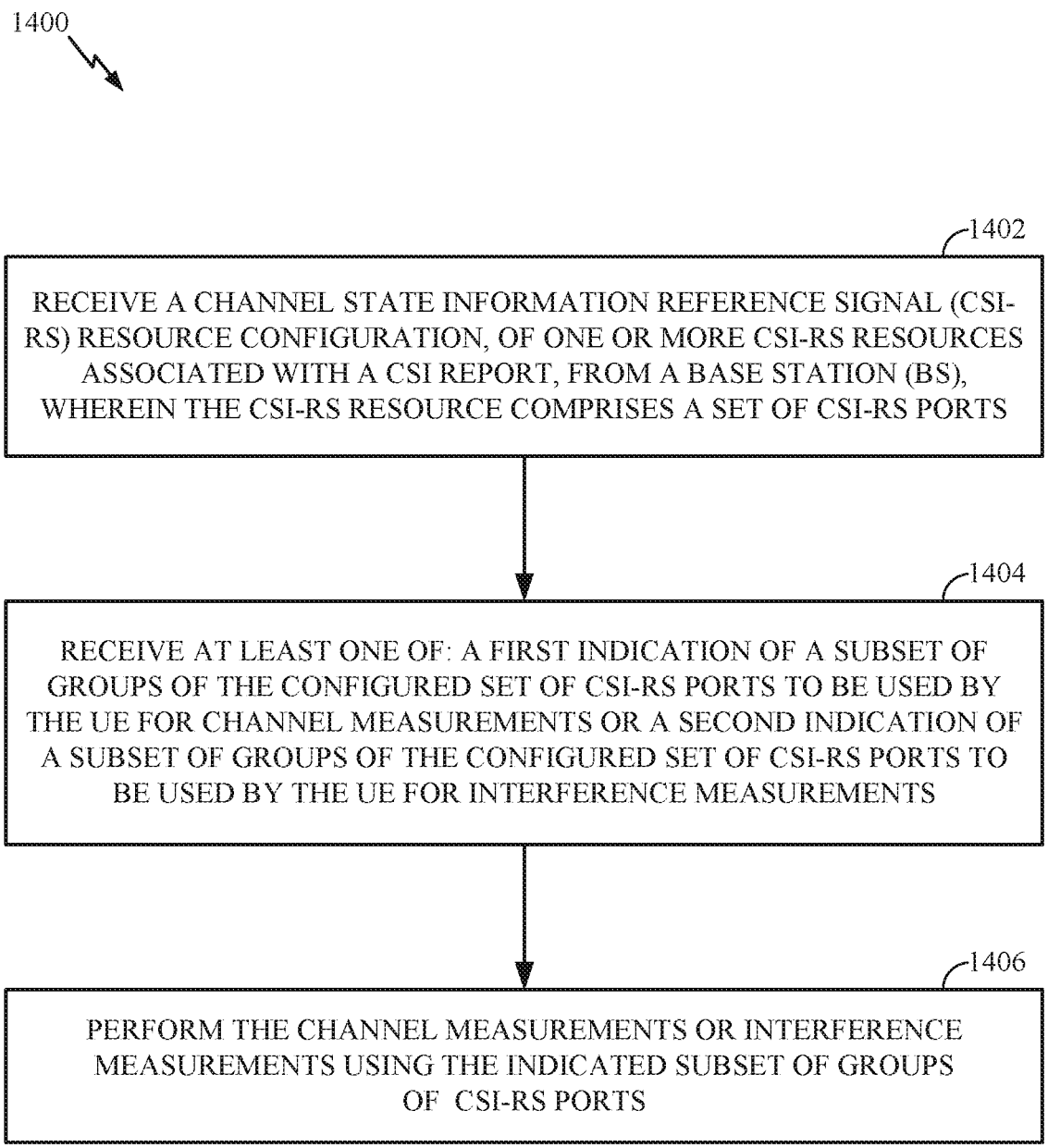
FIG. 14 illustrates example operations for wireless communications performed by a UE, in accordance with certain aspects of the present disclosure.

FIG. 14 illustrates example operations 1400 for wireless communications, in accordance with aspects of the present disclosure. Operations 1400 may be performed by a UE, for example, such as a UE 120 in the wireless communication network shown in FIG. 1. Operations 1400 may be complementary operations by the UE to the operations 1100 performed by the BS.

Operations 1400 begin, at block 1402, by receiving a CSI-RS resource configuration, of one or more CSI-RS resources associated with a CSI report, from the BS. The CSI-RS resource includes a set of CSI-RS ports. The CSI-RS ports may be mapped to REs. The UE may also receive a CS report setting configuration, from the BS, corresponding to the configured CSI-RS ports. At 1404, the UE receives at least one of: a first indication of a subset of groups of the configured set of CSI-RS ports to be used by the UE for channel measurements or a second indication of a subset of groups of the configured set of CSI-RS ports to be used by the UE for interference measurements. At 1406, the UE performs the channel measurements or interference measurements using the indicated subset of groups of CSI-RS ports. After detecting the subset port indication, and based on the CSI-RS port to resource mapping, the UE knows which CSI-RS ports are used channel measurements and/or interference measurement.

Advantageously, techniques provided herein may enable an apparatus (e.g., a BS, gNB, TRP, etc.) to indicate to UEs which CSI-RS ports are used for channel measurement and/or interference measurements. Thus, performance can be improved. For example, the BS can efficiently indicate use of CSI-RS ports to be used channel measurement and/or interference measurements by a UE or multiple UEs based on capabilities and various scenarios. The measurements can be used for CSI reporting, MU-MIMO, and transmissions by multiple TPs.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory. ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 11 and FIG. 14.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
    receiving a channel state information reference signal (CSI-RS) resource configuration, of one or more CSI-RS resources associated with a CSI report, from a base station (BS), wherein the CSI-RS resource comprises a set of CSI-RS ports, the set of CSI-RS ports comprising a plurality of groups of CSI-RS ports, wherein at least one of the groups of CSI-RS ports includes multiple CSI-RS ports;
    receiving at least one of: a first indication of a first subset of the plurality of groups of CSI-RS ports to be used by the UE for channel measurements or a second indication of a second subset of the plurality of groups of CSI-RS ports to be used by the UE for interference measurements, wherein:
        receiving the first indication comprises receiving a first bitmap from the BS indicating, for each group of the plurality of groups of CSI-RS ports, whether that group of CSI-RS ports is to be used for channel measurement including an indication that the first subset of the plurality of groups are to be used by the UE for channel measurement; and
        receiving the second indication comprises receiving a second bitmap from the BS indicating, for each group of the plurality of groups of CSI-RS ports, whether that group of CSI-RS ports is to be used for interference measurement including an indication that the second subset of the plurality of groups are to be used by the UE for interference measurement; and
    performing at least one of: the channel measurements using the indicated first subset of the plurality of groups of CSI-RS ports or the interference measurements using the indicated second subset of the plurality of groups of CSI-RS ports.

2. The method of claim 1, wherein the at least one of: the first indication or the second indication is received semi-persistently via radio resource control (RRC) signaling with the CSI-RS resource configuration or a CSI report setting configuration.

3. The method of claim 1, wherein the at least one of: the first indication or the second indication is received dynamically via a one stage downlink control information (DCI) including a CSI-RS trigger or a CSI report trigger.

4. The method of claim 1, wherein the at least one of: the first indication or the second indication is received dynamically via a two-stage DCI comprising a first stage including a CSI report trigger configuration and a second stage including the at least one of: the first indication or the second indication.

5. The method of claim 1, wherein receiving the second bitmap comprises:
after receiving the first bitmap indicating the first subset of the plurality of groups of CSI-RS ports to be used for channel measurement, receiving one bit from the BS indicating whether the remaining CSI-RS ports of the set of CSI-RS ports are to be used by the UE for interference measurement.

6. The method of claim 1, further comprising:
receiving another bitmap from the BS indicating, for each group of the first subset or the second subset of the plurality of groups of CSI-RS ports, which CSI-RS ports in the group are to be used by the UE for channel measurement or interference measurement.

7. The method of claim 1, wherein the plurality of groups of CSI-RS ports comprises:
CSI-RS ports in a same code division multiplexed (CDM) group or a same component CSI-RS resource group.

8. The method of claim 1, wherein the plurality of groups of CSI-RS ports are configured by a network via higher layer signaling.

9. A method for wireless communications by a base station (BS), comprising:
configuring a user equipment (UE) with a channel state information reference signal (CSI-RS) resource, of one or more CSI-RS resources associated with a CSI report, wherein the CSI-RS resource comprises a set of CSI-RS ports;
partitioning the set of CSI-RS ports into a plurality of groups of CSI-RS ports, wherein at least one of the groups of CSI-RS ports includes multiple CSI-RS ports; and
providing at least one of: a first indication to the UE of a first subset of the plurality of groups of CSI-RS ports to be used by the UE for channel measurement or a second indication to the UE of a second subset of the plurality of groups of CSI-RS ports to be used by the UE for interference measurement, wherein:
providing the first indication comprises providing a first bitmap indicating, for each group of the plurality of groups of CSI-RS ports, whether that group of CSI-RS ports is to be used for channel measurement including an indication that the first subset of the plurality of groups are to be used by the UE for channel measurement; and
providing the second indication comprises providing a second bitmap indicating, for each group of the plurality of groups of CSI-RS ports, whether that group of CSI-RS ports is to be used for interference measurement including an indication that the second subset of the plurality of groups are to be used by the UE for interference measurement.

10. The method of claim 9, wherein the at least one of: the first indication or the second indication is provided semi-persistently via radio resource control (RRC) signaling with a CSI-RS resource configuration or a CSI report setting configuration.

11. The method of claim 9, wherein the at least one of: the first indication or the second indication is provided dynamically via a one stage downlink control information (DCI) including a CSI-RS trigger or a CSI report trigger using a one stage DCI.

12. The method of claim 9, wherein the at least one of: the first indication or the second indication is provided dynamically via a two stage downlink control information (DCI) including a first stage configuring a CSI report trigger and a second stage providing the at least one of: the first indication or the second indication.

13. The methods of claim 9, wherein receiving the second bitmap comprises:
after providing the first bitmap to UE indicating the first subset of the plurality of groups of CSI-RS ports to be used for channel measurement, sending one bit to the UE indicating whether the remaining CSI-RS ports of the set of CSI-RS ports are used by the UE for interference measurement.

14. The method of claim 9, further comprising: p1 sending another bitmap to the UE indicating, for each group of the first subset or the second subset of the plurality of groups of CSI-RS ports, which CSI-RS ports in the group are to be used for channel measurement or interference measurement.

15. The method of claim 14, wherein:
the first and second bitmaps are provided to a group of UEs, and
the another bitmap is UE-specific.

16. The method of claim 9, wherein the partitioning the set of CSI-RS ports is based on at least one of: a size of the set of CSI-RS ports, a size of the first subset of CSI-RS ports, a size of the second subset of CSI-RS orts, a mapping of the set of CSI-RS ports to resource elements (REs), a codebook configuration used for CSI reporting, or an association of the CSI-RS ports and precoders of the codebook.

17. The method of claim 9, wherein the partitioning is configured by a network via higher layer signaling.

18. The method of claim 9, wherein partitioning the set of CSI-RS ports into groups comprises:
partitioning the CSI-RS ports in a same code division multiplexed (CDM) group or a same component CSI-RS resource to a same group.

19. An apparatus for wireless communications, comprising:
means for receiving a channel state information reference signal (CSI-RS) resource configuration of one or more CSI-RS resources associated with a CSI report, from a base station (BS), wherein the CSI-RS resource comprises a set of CSI-RS ports, the set of CSI-RS ports comprising a plurality of groups of CSI-RS ports, wherein at least one of the groups of CSI-RS ports includes multiple CSI-RS ports;
means for receiving at least one of: a first indication of a first subset of the plurality of groups of CSI-RS ports to be used by the apparatus for channel measurements or a second indication of a second subset of the plurality of groups of CSI-RS ports to be used by the apparatus for interference measurements, wherein:
the means for receiving the first indication comprises means for receiving a first bitmap from the BS indicating, for each group of the plurality of groups of CSI-RS ports, whether that group of CSI-RS ports is to be used for channel measurement including an indication that the first subset of the plurality of groups are to be used by the apparatus for channel measurement; and
the means for receiving the second indication comprises means for receiving a second bitmap from the BS indicating, for each group of the plurality of groups of CSI-RS ports, whether that group of CSI-RS ports is to be used for interference measurement including an indication that the second subset of the plurality of groups are to be used by the apparatus for interference measurement; and means for performing at least one of the channel measurements using the indicated first subset of the plurality of groups of CSI-RS ports or the interference measurements using the indicated second subset of the plurality of groups of CSI-RS ports.

20. The apparatus of claim 19, wherein the at least one of: the first indication or the second indication is received semi-persistently via radio resource control (RRC) signaling with the CSI-RS resource configuration or a CSI report setting configuration.

21. The apparatus of claim 19, wherein the at least one of: the first indication or the second indication is received via a one stage DCI including a CSI-RS trigger or a CSI report trigger.

22. The apparatus of claim 19, wherein the at least one of: the first indication or the second indication is received via a two-stage DCI comprising a first stage including a CSI report trigger configuration and a second stage including the at least one of: the first indication or the second indication.

23. The apparatus of claim 19, wherein receiving the second bitmap comprises:
means for, after receiving the first bitmap indicating the first subset of the groups of CSI-RS ports to be used for channel measurement, receiving one bit from the BS indicating whether the remaining CSI-RS ports of the set of CSI-RS ports are to be used by the apparatus for interference measurement.

24. The apparatus of claim 19, further comprising:
means for receiving another bitmap from the BS indicating, for each group of the first subset or the second subset of the plurality of groups of CSI-RS ports, which CSI-RS ports in the group are to be used by the apparatus for channel measurement or interference measurement.

25. An apparatus for wireless communications, comprising:
means for configuring a user equipment (UE) with a channel state information reference signal (CSI-RS) resource, of one or more CSI-RS resources associated with a CSI report, wherein the CSI-RS resource comprises a set of CSI-RS ports;
means for partitioning the set of CSI-RS ports into a plurality of groups of CSI-RS ports, wherein at least one of the groups of CSI-RS ports includes multiple CSI-RS ports; and
means for providing at least one of: a first indication to the UE of a first subset of the plurality of groups of CSI-RS ports to be used by the UE for channel measurement or a second indication to the UE of a second subset of the plurality of groups of CSI-RS ports to be used by the UE for interference measurement, wherein:
the means for providing the first indication comprises means for providing a first bitmap indicating, for each group of the plurality of groups of CSI-RS ports, whether that group of CSI-RS ports is to be used for channel measurement including an indication that the first subset of the plurality of groups are to be used by the UE for channel measurement; and
the means for providing the second indication comprises means for providing a second bitmap indicating, for each group of the plurality of groups of CSI-RS ports, whether that group of CSI-RS ports is to be used for interference measurement including an indication that the second subset of the plurality of groups are to be used by the UE for interference measurement.

26. The apparatus of claim 25, further comprising:
means for sending another bitmap to the UE indicating, for each group of the first subset or the second subset of the plurality of groups of CSI-RS ports, which CSI-RS ports in the group are to be used for channel measurement or interference measurement.

27. The apparatus of claim 26, wherein:
the first bitmap is provided to a group of UEs, and
the other bitmap is UE-specific.

28. The apparatus of claim 25, wherein the at least one of: the first indication or the second indication is provided semi-persistently via radio resource control (RRC) signaling with a CSI-RS resource configuration or a CSI report setting configuration.

29. The apparatus of claim 25, wherein the at least one of: the first indication or the second indication is provided dynamically via a one stage downlink control information (DCI) including a CSI-RS trigger or a CSI report trigger using a one stage DCI.

30. The apparatus of claim 25, wherein the at least one of: the first indication or the second indication is provided dynamically via a two stage downlink control information (DCI) including a first stage configuring a CSI report trigger and a second stage providing the at least one of: the first indication or the second indication.

* * * * *